P. C. C. ISHERWOOD.
TREATMENT OF REFRACTORY ZINC LEAD ORES.
APPLICATION FILED OCT. 18, 1912.
1,089,412.
Patented Mar. 10, 1914.
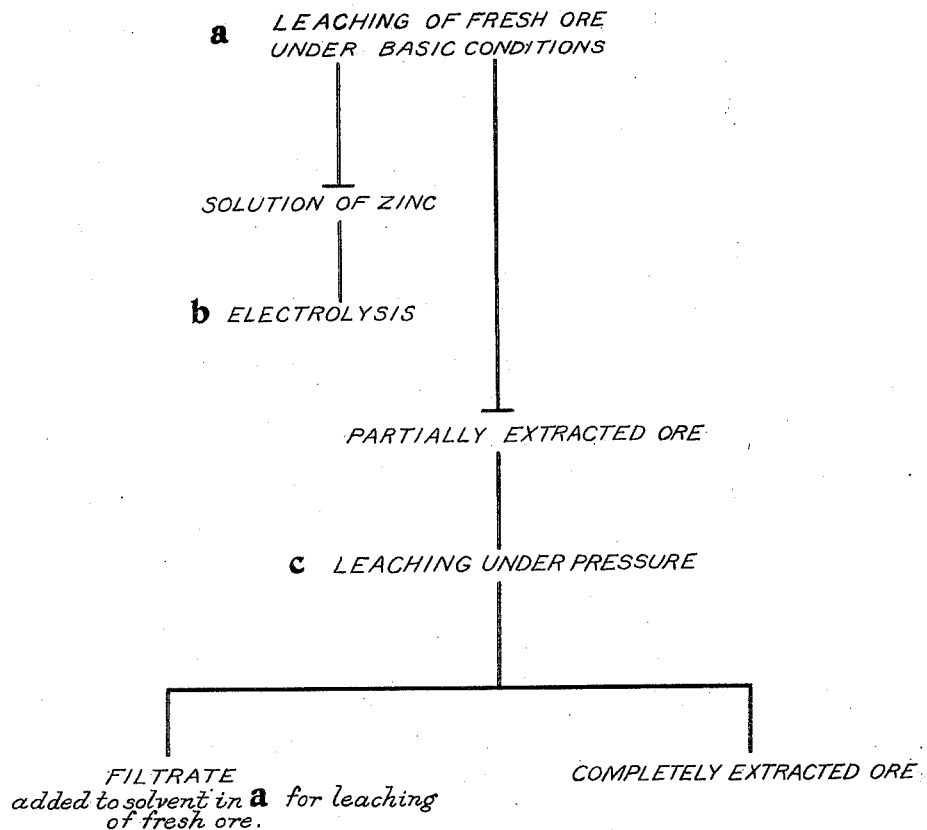

UNITED STATES PATENT OFFICE.

PERCY CLAUDE CAMERON ISHERWOOD, OF BUSHEY HEATH, ENGLAND.

TREATMENT OF REFRACTORY ZINC-LEAD ORES.

1,089,412.     Specification of Letters Patent.     Patented Mar. 10, 1914.

Application filed October 18, 1912. Serial No. 726,525.

*To all whom it may concern:*

Be it known that I, PERCY CLAUDE CAMERON ISHERWOOD, Ph. D., chemist, a subject of the King of Great Britain and Ireland, and resident of Bushey Heath, Hertfordshire, England, and whose post-office address is Moss Cottage, Bushey Heath, Hertfordshire, England, have invented certain new and useful Improvements in and Relating to the Treatment of Refractory Zinc-Lead Ores, of which the following is a specification.

This invention relates to the treatment of refractory zinc lead ores for the recovery of the zinc compounds contained in them, and the invention has for its object to recover practically the whole of the zinc in solution in an effective and economical way, free from contamination with iron, arsenic, or other impurities, the solution being of such purity that after the removal of any copper that may be present the zinc may be recovered by electrolysis and a solution of sulfuric acid of high strength regenerated which may be used again for the treatment of ore.

The invention is applicable to the process of treating such ores according to the prior United States Patent granted to me No. 1,011,962, dated the 19th December, 1911, in which the ore is leached with sulfuric acid at high temperature and pressure in order to take advantage of the increased solubility of zinc oxid in solutions of zinc sulfate at temperatures above the boiling point of solutions of the latter under ordinary conditions of temperature and pressure.

According to the present invention I effect the leaching of such ore in two stages, the first of which is always carried out under basic conditions, that is, under conditions in which an excess of zinc oxid is taken into solution, that is to say, I first leach the ore in an open vat, and I use a quantity of the solvent less than that which is necessary for the solution of the whole of the zinc contained in the ore, and I then subject the treated ore to a second leaching with the remainder of the solvent necessary for the solution of the remainder of the zinc contained in the ore. The solution of the remainder of the zinc contained in the ore is then used for the first leaching of a fresh quantity of ore, which is carried out with a further addition of solvent. The quantity of solvent used in the first leaching, however, is always kept much less than that which is necessary for the complete solution of the zinc contained in the ore treated.

I effect the leaching of the ore at each stage in the use of sulfuric acid and I effect the second leaching in an extractor filter from which I filter the solution. By such means practically the whole of the zinc is recovered in an effective and expeditious way, free from contamination with iron, arsenic, and other impurities by reason of the fact that owing to the addition of the solution or filtrate from the second leaching to the liquor used for the first leaching, the treatment of the ore is always effected under basic conditions, even if the amount of acid used in the extractor filter is in excess. Moreover, owing to these basic conditions, the settling of the suspended fine particles of ore in the solution obtained in the first leach is very quickly and completely effected.

Any copper which may have been dissolved in the treatment of the ore may be removed by known means such as precipitation on zinc.

The present invention is diagrammatically illustrated in the accompanying drawing, in which—

*a* indicates the first step, being the leaching of the fresh ore with sulfuric acid in quantity less than that necessary completely to dissolve the zinc contained in the ore.

*b* indicates the electrolysis of the zinc solution produced by the first leaching.

*c* indicates the second leaching of the partially extracted ore under pressure for the solution of the remaining zinc therein.

In carrying the invention into effect I reduce the ore to a suitable degree of fineness and then roast it under conditions in which the oxidizable sulfids in the ore are converted partly into sulfate and partly into oxid and until no free sulfid remains. The roasted ore is then treated with a solution of sulfuric acid in a vat (step *a*). After treatment, the solution of zinc obtained is withdrawn, and after the recovery of any copper that may be contained in it, the zinc may be recovered therefrom by electrolysis (step *b*) and a solution of sulfuric acid may thus be regenerated of high strength and purity which may be used again for the treatment of ore. The ore from the first leaching thus effected is then treated for further extraction in an extractor filter (step *c*) such as described in the specification of the prior Patent of the United States No. 1,043,939, dated the 12th November, 1912, and the extraction is effected with the remainder of sulfuric acid necessary for the solution of the zinc under conditions of high temperature and pressure, and the pressure employed is advantageously from 50 to 200 lbs. per square inch. After treatment of the ore in the extractor filter, the filter casing is then turned upside down so that the coarse particles of the ore may fall on to the filter plate and the fine particles over them, and thus the internal pressure within the filter casing may be used to cause the solution to filter through. The filtrate from the extractor filter is then used as the leaching liquor for the first leach of a further quantity of ore, sufficient sulfuric acid being added for the solution of the greater part of the zinc contained in the ore. The residual ore from the extractor filter may then be treated for the recovery of the other compounds contained in it. The process is thus continuous, the solution or filtrate produced in the second leaching being always returned for use in the first leaching and the solution from the first leaching being alone treated for the recovery of the zinc.

I advantageously always employ in the first leaching sufficient acid to dissolve about two-thirds of the zinc contained in the ore, and in the second leaching, that is to say, the leaching in the extractor filter, I employ the remainder of the sulfuric acid necessary for the solution of the zinc under conditions of high temperature and pressure. The amount of excess acid that may be contained in the solution or filtrate from the extractor filter, and which is used for leaching fresh ore, is taken into account in the addition of the necessary amount of acid for the first leaching. It will thus be understood that by the use of the solution or filtrate from the second leaching as part of the liquor used for the first leach, the treatment of the ore is effected under basic conditions, that is to say, under conditions in which there is no excess of acid, and should any impurities be dissolved in the second leaching by reason of the presence of an excess of acid these impurities will be precipitated in the first leaching by reason of the basic conditions under which the first leaching is effected.

In the case of ores such as those in which the zinc is present as oxid, the roasting is of course dispensed with, and it is then only necessary to reduce the ore to a suitable degree of fineness to prepare it for treatment according to the process of this invention.

What I claim as my invention and desire to secure by Letters Patent is:—

1. A process for the recovery of zinc from prepared refractory zinc lead ore, consisting in roasting the ore, then leaching the ore under basic conditions with a quantity of fresh sulfuric acid less than that which is necessary for the complete solution of the zinc contained therein and producing a highly basic solution of zinc, afterward leaching the ore with the remainder of the fresh sulfuric acid necessary for the complete solution of the zinc under conditions of high temperature and pressure, and adding the solution of zinc thus produced in the second leaching of the ore to the fresh sulfuric acid used in the first leaching of a fresh quantity of ore.

2. A process for the recovery of zinc from prepared refractory zinc lead ore, consisting in leaching the ore under basic conditions with a quantity of fresh sulfuric acid less than that necessary completely to dissolve the zinc contained therein and producing a highly basic solution of zinc, and then leaching the partially extracted ore under conditions of high temperature and pressure.

3. A process for the recovery of zinc from prepared refractory zinc lead ore, consisting in leaching the ore under basic conditions with a quantity of fresh sulfuric acid less than that necessary completely to dissolve the zinc contained therein and producing a highly basic solution of zinc, then leaching the partially extracted ore under conditions of high temperature and pressure, and then adding the filtrate to the fresh sulfuric acid used in the first leaching of a fresh quantity of ore.

4. A process for the recovery of zinc from prepared refractory zinc lead ore, consisting in leaching the ore under basic conditions in an open vat with fresh sulfuric acid, then leaching the ore under conditions of high temperature and pressure and adding the solution from the second leaching to the quantity of fresh acid used for leaching a fresh quantity of ore and maintaining the quantity of acid used in the first leaching always less than that necessary for the complete solution of the zinc contained in the ore.

5. A process for the recovery of zinc from prepared refractory zinc lead ore, consisting in first leaching the ore under basic conditions with a quantity of fresh sulfuric acid less than that necessary for the complete solution of the zinc contained therein and producing a highly basic solution of zinc and then effecting the extraction of the remainder of the zinc contained in the ore under conditions of high temperature and pressure in an extractor filter.

6. A process for the recovery of zinc from prepared refractory zinc lead ore, consisting in first leaching the ore under basis conditions with a quantity of fresh sulfuric acid less than that necessary for the complete solution of the zinc contained therein and producing a highly basic solution of zinc, then effecting the extraction of the remainder of the zinc contained in the ore under conditions of high temperature and pressure in an extractor filter, and adding the filtrate from the extractor filter to the fresh acid used for the leaching of a fresh quantity of ore.

7. A process for the recovery of zinc from prepared refractory zinc lead ore, consisting in leaching the ore under basic conditions with a quantity of fresh sulfuric acid less than that which is necessary for the complete solution of the zinc contained therein and producing a highly basic solution of zinc, afterward leaching the ore with the remainder of the fresh sulfuric acid necessary for the complete solution of the zinc under conditions of high temperature and pressure, and adding the solution of zinc thus produced in the second leaching of the ore in the first leaching of a fresh quantity of ore, and recovering the zinc by electrolysis from the solution obtained in the first leaching.

In testimony whereof I have hereunto signed my name to this specification in the presence of two subscribing witnesses.

PERCY CLAUDE CAMERON ISHERWOOD.

Witnesses:
M. J. TROWELL,
J. H. KING.